(12) United States Patent
Jennings

(10) Patent No.: X9833
(45) Date of Patent: Jul. 1, 1836

(54) STEAM, GENERATING

(76) Inventor: Isaiah Jennings

Isaiah Jennings
No. 5.2.8

The schedule referred to in these Letters Patent and mak-
ing part of the same containing a description of the same in the
words of the said Isaiah Jennings himself of his improve-
ment in the apparatus for the generating and condens-
ing of steam for steam engines and of vapour in the pro-
cess of distillation . To all whom it may con-
cern, be it known that I Isaiah Jennings of the city
of New York in the State of New York have invented an
improved apparatus to be used as a boiler or condenser for
generating or condensing steam in steam engines and va-
pours of various kinds in distillation, and I do hereby
declare that the following is a full and exact description
thereof. The boiler or condenser may be made in any form
which may be desired, but in general I prefer to make
them flat or plain, excepting that they must have
protuberances and indentations on their surfaces result-
ing from their particular construction, which is as fol-
lows, metal plates are taken and these are to be so wrou-
ght by hammering, stamping or otherwise, that their whole
surface on each side shall present alternate convexities
and concavities regularly distributed, and so that when
two such plates are laid upon each other, their convex
parts shall come into contact with each other, for a boiler
of ordinary size the touching points may be about four
inches apart, but this distance will vary according
to the strength of the metal and the pressure to which it
is to be subjected. at each of these touching points the
metals is to be perforated to receive stay bolts by which
the plates are to be secured together, as well as at their
edges. The cavities between the plates will then com-
municate freely with each other and will form a com-
mon mon receptacle for water &c. These double plates may be
or any multiple [illegible]
bent into a cylindrical or other form of vessel, and duly ex-
of them may be placed side by side
posed to the action of the heating or refrigerating agents; as will
be readily understood by any competent engineer. In
situations where water is scarce, or when other consider-
ations may render it proper, I intend to use air as a con-
densing agent, forcing it over the surfaces of the condensing
plates by means of a revolving fan or other blowing ap-
paratus— What I claim as my invention and wish
to secure by Letters Patent, is the making of boilers or
condensers of double sheets of Metal bent in the way
herein described, and united together by stay bolts, up-
on the principle and for the purposes set forth.

Witnesses

16. B. E. B. Ry. Morrell                Isaiah Jennings

Dec 1837 Wm Cooper Jr

Drawing made [450 words